US008525773B2

(12) United States Patent
Lo et al.

(10) Patent No.: US 8,525,773 B2
(45) Date of Patent: Sep. 3, 2013

(54) APPARATUS FOR CONTROL LIQUID CRYSTAL TIMING

(75) Inventors: Chih-Yueh Lo, Hsinchu Hsien (TW); Jyi-Maw Hung, Chiayii (TW)

(73) Assignee: Au Optronics Corporaiton, Hsinchu (TW)

( * ) Notice: Subject to any disclaimer, the term of this patent is extended or adjusted under 35 U.S.C. 154(b) by 1995 days.

(21) Appl. No.: 10/250,123

(22) Filed: Jun. 5, 2003

(65) Prior Publication Data

US 2003/0227434 A1 Dec. 11, 2003

(30) Foreign Application Priority Data

Jun. 6, 2002 (TW) .............................. 91112175 A

(51) Int. Cl.
*G09G 3/36* (2006.01)
*G02F 1/1335* (2006.01)

(52) U.S. Cl.
USPC ............................................ 345/102; 349/61

(58) Field of Classification Search
USPC ............................................ 345/102; 349/61
See application file for complete search history.

(56) References Cited

U.S. PATENT DOCUMENTS

| | | | | |
|---|---|---|---|---|
| 4,959,642 | A * | 9/1990 | Sharples | 345/5 |
| 6,466,188 | B1 * | 10/2002 | Cato | 345/82 |
| 2002/0130786 | A1 * | 9/2002 | Weindorf | 340/815.45 |
| 2003/0210221 | A1 * | 11/2003 | Aleksic | 345/102 |

* cited by examiner

*Primary Examiner* — Srilakshmi K Kumar
(74) *Attorney, Agent, or Firm* — Jianq Chyun IP Office

(57) ABSTRACT

An apparatus for controlling the liquid crystal timing has a back light driving device to provide a constant current. The apparatus for controlling the liquid crystal timing is used to control the liquid crystal display at the specific timing period.

10 Claims, 1 Drawing Sheet

APPARATUS FOR CONTROL LIQUID CRYSTAL TIMING

CROSS REFERENCE TO RELATED APPLICATIONS

This application claims the priority benefit of Taiwan application serial no. 91112175, filed on Jun. 6, 2002.

BACKGROUND OF INVENTION

1. Field of Invention

The present invention relates to an apparatus for controlling a liquid crystal timing. More particularly, the present invention relates to an apparatus for controlling a liquid crystal timing, in which a back light driving device is built-in.

2. Description of Related Art

The liquid crystal display (LCD) has had applications on the calculator and the electronic watches since 1970. After then, many properties of photoelectric effect have been discovered, and the driving technologies have been greatly improved. Now, the LCD has several advantages, such as high quality of image displaying, low power consumption, thin and in massive production, low driving voltage, and small volume. The current applications have been applied to the portable TV, image phone, video device, notebook computer, desk displaying terminal, or the projection color TV. It have been one of the promising part for a product.

In general, the LCD includes a large number of image pixels. When an image is to be displayed on the LCD, a graphic controller of the LCD will export the vertical synchronizing signal, horizontal synchronizing signal, and color signal to the liquid crystal timing controller. The liquid crystal timing controller the exports a control signal, according to the above signals, to the gate driver and exports the color signal to the data driver. As a result, the pixels are controlled in action.

Since the liquid crystal by itself cannot emit the light, it is necessary to include a back light source or an external light source to serve as the light source for displaying the image on the screen. In the case of using a light emitted diode (LED) to serve as a back light source, it usually needs a constant current to supply to each LED by a constant current source. Otherwise, it would easily occur that the LED is burnt down or the brightness is not uniform. The current conventional method is basically categorized into two manners. One is that each of the LED of the back light source is driven by coupling with a resistor in cascade. However, this manner does not improve efficiency or even reduce the efficiency. Another conventional method is directly using a constant current chip to provide a constant current to each LED. However, this constant current chip has to be designed externally. This would increase the use of space for the LCD driving circuit. Also and the fabrication cost is also increased.

SUMMARY OF INVENTION

One of the objectives of the invention is to provide an apparatus for controlling a liquid crystal timing, which can combine with a back light driving device having a constant current source, so that the efficiency can be improved. Also and, the cost and space can be saved.

Another one of the objectives of the invention is to provide an apparatus for controlling a liquid crystal timing, which includes a back light driving device. The apparatus for controlling a liquid crystal timing has the function to have a constant current, and can be used provide the constant current to the back light source, such as the light emitted diode. The apparatus for controlling a liquid crystal timing controls the liquid crystal display at the specific timing period.

Another one yet of the objectives of the invention is to provide an apparatus for controlling a liquid crystal timing, which can combine a back light driving device having a constant current source, but it is not necessary to use the resistors coupled in cascade for driving the back light source, so as to improve the efficiency and save the cost and space.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
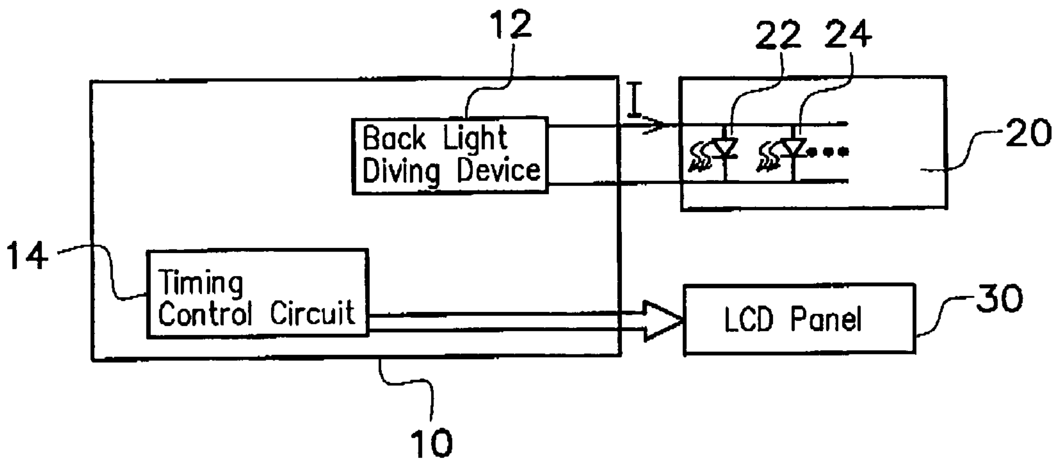
FIG. 1 is an apparatus for controlling a liquid crystal timing, wherein the back light source is a light emitted diode, according to one preferred embodiment of this invention.

Referring to FIG. 1, it is a drawing, schematically illustrating an apparatus for controlling a liquid crystal timing 10, with a back light source 20, according to one preferred embodiment of this invention. The back light source 20 can be a light emitted diode or any type being used for operation as the back light source. The invention does not limit the type of back light source. For the preferred embodiment of the invention, the back light source 20 is composed of a number of light emitted diodes 22, 24, â□. The apparatus for controlling a liquid crystal timing 10 for the embodiment includes a timing control circuit 14 and a back light driving device 12, such as a light emitted diode (LED) driving device. In order to assure that the back light source 20 can be operated in stable, the back light driving device 12 is built in the apparatus for controlling a liquid crystal timing 10 in the embodiment and exports a constant current I to the back light source 20. Since the back light driving device 12 includes the function for constant current, it can be used as a current source generator. The function of constant current of the back light driving device 12 can be achieved by using an integrated circuit for constant current. Since the liquid crystal molecules in the liquid crystal display cannot emit light by itself, it needs the light from the back light source 20 to achieve the image displaying effect, so as to display image on the LCD. The timing control circuit 14 in the apparatus for controlling a liquid crystal timing 10 then exports the timing control signals to the driving device on the LED panel, such as the data driving device, the gate driving device, and all of the needed timing control for controlling the LED.

The back light driving device 12 includes the function to have a constant current, so as to provide a constant current to the back light source 20, such as the LED's 22, 24. The timing control circuit 14 controls the LCD panel 30 at the specific timing period. For example, when an image is to be displayed on the LCD panel 30, under the specific timing period, such as three clock cycles, the timing control circuit 14 will receive the vertical signals, the parallel signals, and the color signals from the graphic controller (not shown). Then, the timing control circuit 14 would export the control signal and the color signal to the gate driving device (not shown), according to the vertical signals, the parallel signals, and the color signals, so as to control the degree of twist angle on the liquid crystal molecules for each pixel. Since the liquid crystal in each pixel cannot emit light by itself, the invention use the back light driving device 12 to drive the LED's 22, 24 to serve as the back light source 20. Further, the apparatus for controlling a liquid crystal timing 10, according to the foregoing signals, then exports the control signal to the gate driving device and exports the color signal to the data driving device, so that each pixel can display the desired effect.

As known by the skilled artisans, the apparatus for controlling a liquid crystal timing of the invention can be applied to LCD of the computer system, the LCD of the portable electronic device, and the usual LCD. The apparatus for controlling the liquid crystal timing used in the foregoing devices has the same function of the timing control circuit and the back light driving device.

The advantages of the invention includes that the back light driving device with a constant current source is combined with the apparatus for controlling the liquid crystal timing. As a result, when the apparatus for controlling the liquid crystal timing is in operation, a constant current can also be supplied at the same time without the need of the cascade resistors coupled with the light emitted diode. The efficiency can be improved, and the fabrication cost and space can be saved.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

The invention claimed is:

1. An apparatus comprising a liquid crystal timing control circuit and a back light driving device built in together, wherein the liquid crystal timing control circuit is adapted for controlling a liquid crystal timing under a specific timing period to a liquid crystal panel, and the back light driving device includes a function for providing a power with a constant current to drive a plurality of light emitting diodes of a back light source to provide light for the liquid crystal panel, wherein the liquid crystal timing control circuit outputs a timing control signal to the back light driving device for controlling the light emitting diodes of the back light source.

2. The apparatus of claim 1, wherein the back light source is formed by the plurality of light emitted diodes.

3. The apparatus of claim 1, wherein the back light driving device can be used in a computer system, a liquid crystal display of a portable electronic device.

4. The apparatus of claim 1, wherein the back light driving device includes a constant-current integrated circuit, so as to stabilize the current.

5. An apparatus, combining a liquid crystal timing control circuit with a back light driving device to be built in the apparatus, wherein the liquid crystal timing control circuit is adapted for controlling a liquid crystal timing under a specific timing period to a liquid crystal panel, the back light driving is adapted for providing a power with a constant current to drive a plurality of light emitting diodes in a back light source to provide light for the liquid crystal panel at the same time, wherein the liquid crystal timing control circuit outputs a timing control signal to the back light driving device for controlling the light emitting diodes of the back light source.

6. The apparatus of claim 5, wherein the back light source is formed by the plurality of light emitted diodes.

7. The apparatus of claim 5, wherein the back light driving device can be used in a computer system, a liquid crystal display of a portable electronic device.

8. The apparatus of claim 5, wherein the back light driving device includes an constant-current integrated circuit, so as to stabilize the current.

9. An apparatus comprising a liquid crystal timing control circuit and a back light driving device built in together, wherein the liquid crystal timing control circuit is adapted for controlling a liquid crystal timing under a specific timing period to a liquid crystal panel, and the back light driving device is adapted for directly providing a constant current to a plurality of light emitting diodes of a back light source to provide light for the liquid crystal panel, wherein the liquid crystal timing control circuit outputs a timing control signal to the back light driving device for controlling the light emitting diodes of the back light source.

10. An apparatus essentially consisting of a liquid crystal timing control circuit and a back light driving device built in together, wherein the liquid crystal timing control circuit is adapted for controlling a liquid crystal timing under a specific timing period to an external liquid crystal panel, and the back light driving device is adapted for providing a power with a constant current to an external back light source in relation to the liquid crystal timing, wherein the liquid crystal timing control circuit outputs a timing control signal to the back light driving device for controlling the light emitting diodes of the back light source.

* * * * *